Figure 1:
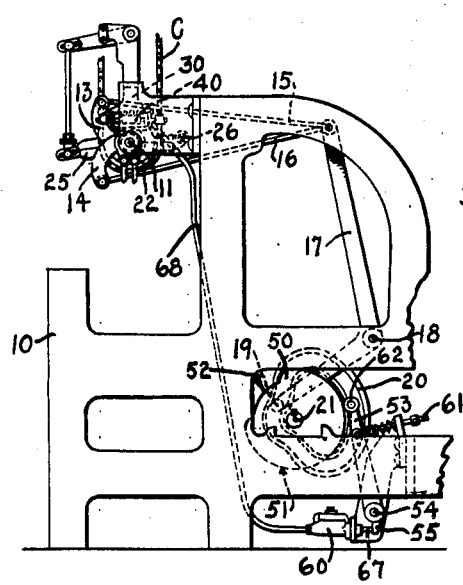

March 28, 1944.   N. FLETCHER ET AL   2,345,334
BRAKE FOR AXMINISTER LOOM PULL-OVER SHAFTS
Filed Sept. 28, 1942   2 Sheets-Sheet 1

INVENTORS
WALTER Y. ROBB
NORMAN FLETCHER
ATTORNEY

March 28, 1944. N. FLETCHER ET AL 2,345,334
BRAKE FOR AXMINSTER LOOM PULL-OVER SHAFTS
Filed Sept. 28, 1942 2 Sheets-Sheet 2
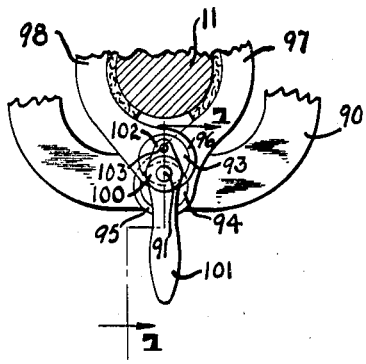
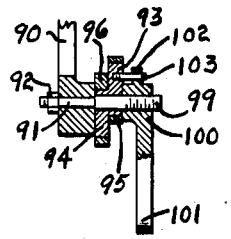
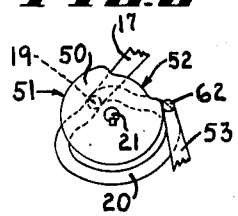
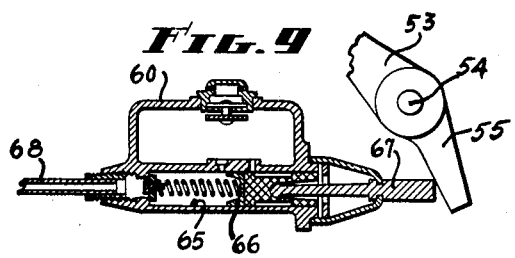
INVENTORS
WALTER Y ROBB
NORMAN FLETCHER
ATTORNEY Patented Mar. 28, 1944

2,345,334

UNITED STATES PATENT OFFICE 2,345,334

BRAKE FOR AXMINSTER LOOM PULL-OVER SHAFTS

Norman Fletcher, Worcester, and Walter Y. Robb, Whitinsville, Mass., assignors to Crompton & Knowles Loom Works, Worcester, Mass., a corporation of Massachusetts Application September 28, 1942, Serial No. 459,936

5 Claims. (Cl. 139—9)

This invention relates to Axminster looms and it is the general object of the invention to provide brake mechanism for the tube frame pullover shafts of such looms.

Axminster looms operate with a series of tube frames which are moved by a pullover shaft one at a time to transfer position from which they are moved by transfer arms toward and from the cloth for the formation of tufts. It is essential that the transporting chains which carry the frames and are driven by the shaft be held in fixed position to register with the tube frame returned to them.

A pullover shaft brake of the type shown in patent to Jenckes No. 1,470,007 is not readily adaptable to wide Axminster looms wherein considerable pressure must be exerted by the brake shoes to hold the pullover shaft stationary. This previously patented mechanism uses a spring which, in order to be effective on wide looms, must be so strong as to interfere with manual release of the brake. It is an important object of our present invention to apply two brake arms to the pullover shaft and connect them by a readily releasable mechanism, such as an eccentric, which permits automatic operation by a hydraulic cylinder.

It is another object of our present invention to consolidate the pivot for the brake arms with a manual releaser in such a way that the means by which the brake can be manually relieved is also the pivot for the arms. The mechanism thus simplified uses fewer parts but permits the application of a greater braking force than is feasible with previously proposed brakes.

It is a still further object of our invention to attach the two brake arms together by a form of connection which includes an eccentric normally serving as a pivot for the arms but rotatable manually to release the arms when it is desired to move the pullover shaft independently of the loom.

It is a still further object of our present invention to provide a pair of brake shoes adapted for cooperation with a hydraulic brake connected to a master cylinder which is operated in timed relation with the mechanism which turns the pullover shaft.

With these and other objects in view which will appear as the description proceeds, our invention resides in the combination and arrangement of parts hereinafter described and set forth.

Figure 2:
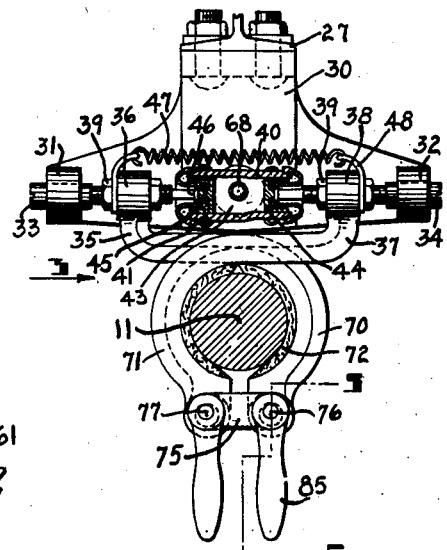
Figures 3, 5:
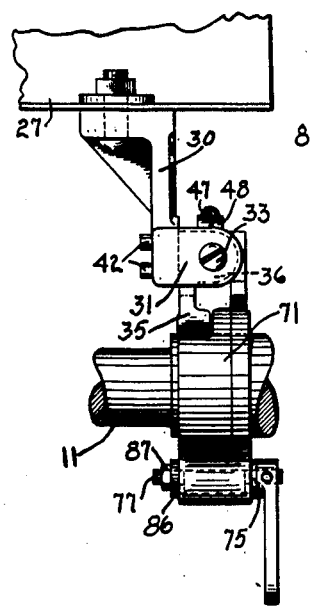
Figure 4:
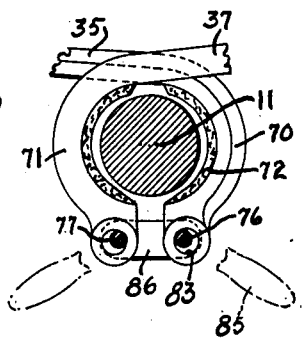

In the accompanying drawings, wherein two forms of our invention are set forth,

Fig. 1 is a side elevation of a portion of an Axminster loom having our invention applied thereto, Fig. 2 is an enlarged transverse vertical section through the pullover shaft and showing the preferred form of the mechanism, Fig. 3 is a front elevation looking in the direction of arrow 3, Fig. 2, Fig. 4 is a diagrammatic view showing the operation of the eccentrics set forth in Fig. 2, Fig. 5 is an enlarged vertical section on line 5—5 of Fig. 2, Fig. 6 is a view similar to Fig. 2 but showing the modified form of combined brake arm pivot and manual release, Fig. 7 is a vertical section on line 7—7 of Fig. 6, Fig. 8 is a diagrammatic view of the two cams which operate the pullover shaft operating and brake mechanisms, and Fig. 9 is a vertical section through the master hydraulic cylinder.

Referring to the drawings, Fig. 1 shows a loom frame 10 in the upper part of which is mounted a pullover shaft 11 on which are mounted feeding arms 13 and 14 connected by rods 15 and 16, respectively, to a cam lever 17. The lever is pivoted as at 18 and carries a roll 19 received by the groove of a cam 20 secured to the loom shaft 21. Sprockets 22 on shaft 11 and their tube frame transporting chains C, one of each being shown in Fig. 1, move with the shaft. In the present instance shaft 11 makes a rotation every third pick of the loom to produce so-called three-shot Axminster weave, but we are not limited in the practice of our invention to a shaft rotating in this time.

A shield 25 is pivoted to the loom frame at 26 and can assume any one of three positions in the central or neutral one of which both levers 13 and 14 are prevented from turning the pullover shaft and in the other positions of which either arm 13 or arm 14 will turn the shaft clockwise or counter-clockwise, respectively, as seen in Fig. 1. The loom includes in its construction a cross beam 27 the purpose of which will appear hereinafter. During the time that a new tube frame is moving to transfer position the pullover shaft should be free to turn under the action of cam 20, but during the interval in which a tube frame is performing a tuft forming operation shaft 11 should be held stationary. The parts thus far described are of usual construction and may be made and operated in the ordinary manner.

In carrying our present invention into effect, we provide means for alternately holding and releasing the pullover shaft 11 at regular intervals during loom operation and also provide means by which the brake may be released at any time to permit manual or other turning of shaft 11 when the shield 25 is in neutral position.

In the preferred form of invention we secure a stand 30 to the under side of the cross beam 27 and provide the same with spaced left and right end bearings 31 and 32, respectively, in which are loosely fitted sliding studs 33 and 34, respectively. Each stud has associated therewith a brake arm, the left arm 35 having a hub 36 which receives the stud 33, and the right arm 37 having a hub 38 to receive the right stud 34. The studs are held in longitudinally adjusted positions in their respective hubs by lock nuts 39 and the studs have their adjacent ends reduced for cooperation with the pistons of a hydraulic brake cylinder designated generally at 40.

Cylinder 40 comprises a main body 41 bolted at 42 to the bracket or stand 30. The body has therein a cylindrical bore 43 which receives at its right and left ends, respectively, pistons 44 and 45 each having a pressure head 46 to bear against the reduced end of the adjacent stud. A tension spring 47 held by clips 48 on the studs as shown in Fig. 2 tends to move the hubs 36 and 38 toward each other against the action of brake cylinder 40.

The bottom shaft 21 has secured thereto a cam 50 formed with a relatively long high dwell 51 and a shorter low dwell 52. A cam lever 53 moves about a pivot 54 fixed on the loom frame and has a short arm 55 for cooperation with a master hydraulic cylinder 60 fastened to the loom frame. A spring pressure rod 61 supported and guided as shown in Fig. 1 urges the roll 62 of lever 53 against the face of the cam 50. The master cylinder has an internal bore 65, see Fig. 9, in which is slidable a piston 66 having a projecting stem 67 for engagement with the arm 55. A hydraulic tube 68 connects the bore of cylinder 60 with the bore of the brake cylinder 40.

In the preferred form of brake arm mounting shown in Fig. 2 the arms 35 and 37 are formed with substantially semicircular shoes 70 and 71, respectively, each lined with a friction material or pad 72, such as leather, shaped and positioned for engagement with the pullover shaft 11. The lower ends of the shoes are connected to a link 75 by means of eccentric studs 76 and 77, rotatable, respectively, with the arms 35 and 37. Since the eccentric studs are both alike and as shown in Fig. 5, only one of them will be described in detail. Stud 76 has right and left reduced trunnions 80 and 81, respectively, between which extends the larger eccentric 82 passing through a bore 83 in the bottom of shoe 70. The gudgeon 80 extends through the link 75 and has secured to the right end thereof a handle 85. The left gudgeon 81 extends through a link 86 similar to link 75 and held against shoe 70 by a nut 87. The link 86 and nuts 87 normally hold the handles 85 and their eccentrics in such position as to draw the lower ends of the shoes 70 and 71 together, but when the handles are thrown away from each other the eccentrics act to separate the shoes 70 and 71 as shown in dotted lines, Fig. 4, for the purpose of relieving pressure between the pullover shaft and the leather pads 72. The pressure exerted by nuts 87 is sufficient to retain the eccentrics in normal position during ordinary loom operation, but are not too tight to permit turning of the eccentric by handles 85.

The modified form of attachment for the lower ends of the brake arms is shown in Figs. 6 and 7. The stand 30 has secured thereto a depending U-shaped support 90 in the lower end of which is secured the reduced end of a stud 91 held in angularly adjusted position by lock nut 92. The larger end of the stud has loosely journaled thereon combined top and bottom eccentrics 93 and 94, respectively, received by eccentric straps 95 and 96, respectively, of shoes 97 and 98 corresponding to shoe 70 and 71. The right end of stud 91 as seen in Fig. 7 is threaded as at 99 to receive the similarly threaded hub 100 of a handle 101. A web 102 on hub 100 carries a pin 103 fixed with respect to the eccentrics, as by being tapped into eccentric 93. Under normal conditions the eccentrics 93 and 94 will be clamped between the lower end of support 90 and hub 100 as shown in Fig. 6 to serve as stationary pivots for their respective shoes. When handle 101 is thrown to the right, Fig. 6, the hub 100 moves along threaded end 99 of stud 91 to relieve pressure on the eccentrics and at the same time shift the latter in opposite directions laterally to separate shoes 97 and 98 to release shaft 11.

It is believed that the operation of our invention will be apparent from the foregoing description. Under normal conditions the eccentrics in both the preferred and the modified forms will be so located as to draw the lower ends of the brake shoes together. Under these conditions high dwell 51 of cam 50 can cause lever 53 to move the stem 67 of the master cylinder inwardly to maintain a high degree of fluid pressure within the hydraulic system tending to move the pistons of the brake cylinder in such a direction as to force the brake arms against shaft 11. During the time that the pullover shaft is to be locked while a tube frame is detached from the chain C, moved to tuft forming position, and returned to the chain, dwell 51 will push stem 67 to the left, Figs. 1 and 9. Subsequent to the tuft forming operation, the low dwell 52 permits lever 53 to be moved in a direction by its spring plunger 61 such as will permit a reduction of fluid pressure within the hydraulic system and the brake shoes will slacken their grip on the pullover shaft. The spring 47 may be used to assist in moving the brake shoes away from shaft 11, but it is not necessary under all conditions, inasmuch as a mere reduction of fluid pressure within the brake cylinder will relieve the braking effect sufficiently to permit the pullover shaft to turn.

The cam 20 is so related to the cam 50 that the start of a working stroke of the arms 13 and 14 coincides with a reduction of the braking force effected by cam 50. The arms 35 and 37 will tend to have a slight angular movement around shaft 11 when moving relatively to each other, but the fit between the studs 33 and 34 and their guiding hubs 31 and 32, respectively, is sufficiently loose to permit such movement. If it is desired to release shaft 11 from the brake shoes the eccentrics in the preferred form may be moved by the handles 85 to spread the lower ends of the brake arms, and in the modified form the handle 101 can be thrown to the right as viewed in Fig. 6.

From the foregoing it will be seen that we have provided a simple form of brake mechanism for the pullover shaft of an Axminster loom including a hydraulic brake cylinder located between brake arms and operative normally to maintain braking force but releasable so that the shaft can be rocked to advance the next tube frame to the transfer station. It will also be seen that the shoes rock about eccentrically mounted pivots which can be moved angularly in a manual operation separate the shoes and relieve their braking effect on the pullover shaft, and this movement of the eccentrics can occur regardless of the position of cams 20 and 50. It will further be seen that in the preferred form of the invention each brake shoe has its own eccentric mounting, while in the modified form a double eccentric on a single axis serves as a mounting for the brake shoes. In both instances, however, the connections between the brake shoes includes an eccentric which serves as a pivotal connection between the shoes but which can be rocked manually to effect release of brake pressure on the shaft 11. The combining of the shoe pivots with the releasing of the braking force is a feature of our invention not necessarily associated with hydraulic means to operate the brake arms.

The relationship between the brake shoes and the eccentric connection between them is not claimed herein but is the subject matter of a divisional application Serial No. 478,388, filed March 8, 1943.

Having thus described our invention it will be seen that changes and modifications may be made therein by those skilled in the art without departing from the spirit and scope of the invention and we do not wish to be limited to the details herein disclosed, but what we claim is:

1. In an Axminster loom having a tube frame transporting chain operating pullover shaft, a driving shaft for the loom, means operated by the driving shaft to give the pullover shaft regularly recurring periods of angular movement to advance the chain, hydraulic brake mechanism for said shaft, and hydraulic means hydraulically connected to the brake mechanism and operated by a force derived from said driving shaft to cause said hydraulic brake mechanism to apply a braking force to said shaft between said periods.

2. In an Axminster loom having a pullover shaft for the tube frame transporting chains, a driving shaft for the loom, means operated by the driving shaft to give the pullover shaft regularly recurring periods of angular movement to advance the chains, a hydraulic brake for said pullover shaft, a master hydraulic cylinder connected hydraulically to said hydraulic brake, and mechanism operated by the driving shaft in time relation with respect to said means and acting on the master cylinder to cause said brake to apply a braking force on said pullover shaft between said periods.

3. In an Axminster loom having a pullover shaft for the tube frame transporting chains and operating with a driving shaft connected to the pullover shaft to give the latter regularly recurring periods of angular movement to advance the chains, a hydraulic brake for said shaft, a master hydraulic unit hydraulically connected to said brake, and control mechanism operated by the driving shaft to cause said unit to operate said brake to apply a braking force to said pullover shaft between said periods and ineffective to cause said unit to operate the brake during said periods.

4. In an Axminster loom having a tube frame transporting chain pullover shaft operated by connections to the loom driving shaft to have regularly recurring periods of angular movement to advance the chain, a pair of brake shoes for said pullover shaft, a pivotal connection between said shoes, a hydraulic brake unit operatively connected to said shoes, hydraulic means connected hydraulically to said unit, and mechanism operated by the driving shaft to cause said unit to cooperate with said pivotal connection and cause said shoes to apply a braking force to said shaft between said periods.

5. In an Axminster loom having a pullover shaft for the tube frame transporting chains and operating with a driving shaft, a regularly moving cam rotating with said driving shaft, a pair of brake shoes disposed around said pullover shaft, and hydraulic means operatively connected to said cam and to said shoes and operated by said cam to cause said shoes to apply a braking force to said pullover shaft at regularly recurring intervals as the driving shaft rotates.

NORMAN FLETCHER.
WALTER Y. ROBB.